Aug. 9, 1938.  A. H. WEIERTZ ET AL  2,126,071
AUXILIARY AIR CONTROLLER FOR INTERNAL COMBUSTION ENGINES
Filed March 23, 1937  2 Sheets-Sheet 1

Inventors:
Axel Hugo Weiertz
and Per Axel Reinar Weiertz
By [signature]
Atty.

Aug. 9, 1938.   A. H. WEIERTZ ET AL   2,126,071
AUXILIARY AIR CONTROLLER FOR INTERNAL COMBUSTION ENGINES
Filed March 23, 1937   2 Sheets-Sheet 2
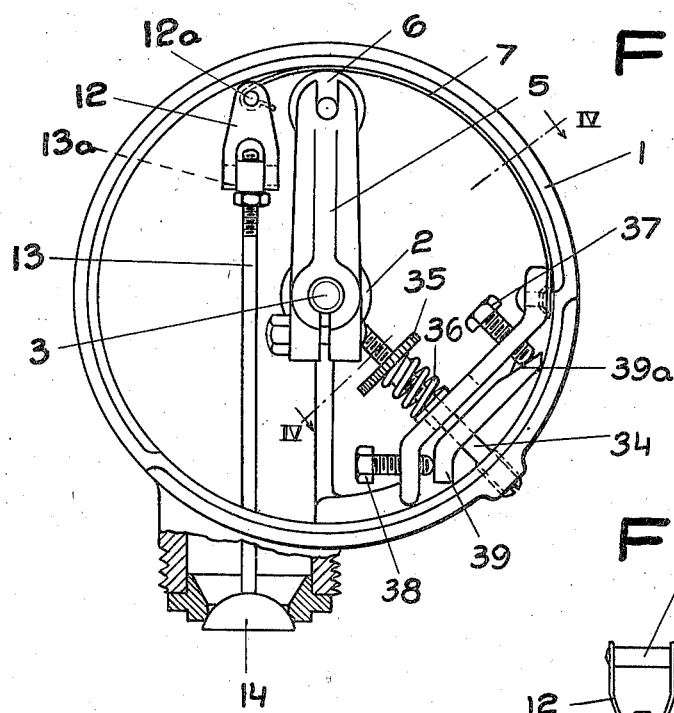
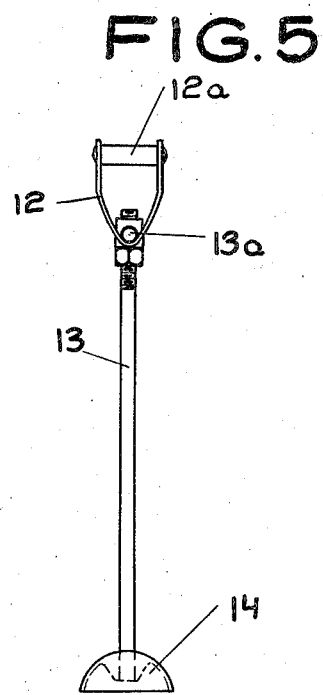
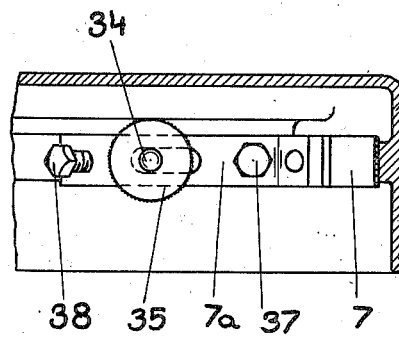
Inventors:
Axel Hugo Weiertz
and Per Axel Reinar Weiertz
By Patented Aug. 9, 1938

2,126,071

UNITED STATES PATENT OFFICE 2,126,071

AUXILIARY AIR CONTROLLER FOR INTERNAL COMBUSTION ENGINES

Axel Hugo Weiertz and Per Axel Reinar Weiertz, Svedala, Sweden

Application March 23, 1937, Serial No. 132,456
In Sweden March 23, 1936

15 Claims. (Cl. 123—119)

The present invention relates to auxiliary air controllers for internal combustion engines of the type in which the engine draws in its supply of air through a main air inlet which usually is provided in a carburettor and is controlled by a throttle valve for controlling the power of the engine, and also through an auxiliary air inlet which opens into the induction pipe or manifold of the engine behind the power controlling throttle valve and is controlled by a spring loaded valve which opens itself under the influence of the vacuum which is created in the induction pipe of the engine.

The main object of this invention is to reduce the fuel consumption of the engine by providing an auxiliary air controller which automatically controls the auxiliary air supply according to the prevailing working conditions of the engine, and the position of the power controlling throttle valve, so that the engine, within practically the whole load and speed range thereof, at any given load and power controlling valve position will arrive at the highest speed, efficiency and power possible at such load and power controlling valve position, when the combustible mixture of air and fuel is of the composition determined by the amount of auxiliary air admitted under the automatic control of the auxiliary air controller. For obtaining this result in accordance with the present invention it has been found necessary that the spring load on the automatic valve in the auxiliary air inlet is made positively variable in dependence upon the position of the power controlling throttle valve in the main inlet to the induction pipe or manifold of the engine, so that the said spring load permits the auxiliary air valve to move longer in its opening direction for the same increase of the vacuum in the induction pipe at a higher than at a lower opening position of the power controlling throttle valve. This positive variation of the spring load on the automatically acting auxiliary air valve may be obtained in a very simple and efficient manner by exerting the spring load on the auxiliary air valve by means of a spring which is positively variable in respect of its active length in dependence on the position of the power controlling throttle valve in such a manner that the active spring length is greater and consequently the spring softer, or more resilient, so that it will yield more for the same increase of the force applied thereupon by the auxiliary air valve under the influence of the vacuum in the induction pipe at a higher than at a lower opening position of the power controlling throttle valve.

Such an embodiment of the invention is illustrated in the accompanying drawings in which:—

Fig. 3 shows a somewhat modified form of the apparatus in elevation, partly in section, and Fig. 4 is a section substantially on the line IV—IV in Fig. 3.

Fig. 5 is an elevation of the auxiliary air valve proper seen at right angles to Fig. 4.

Figure 1:
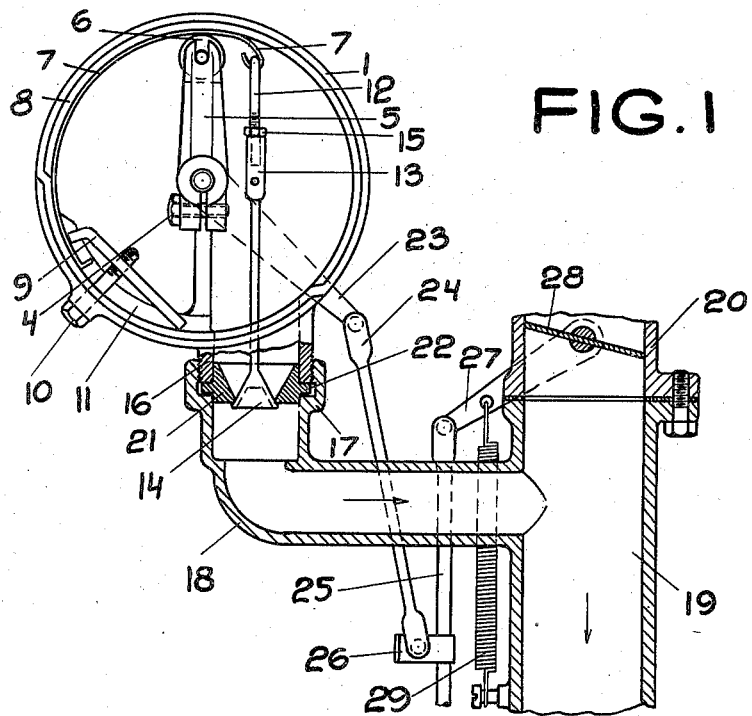
Fig. 1 is an elevation, partly in section, of the auxiliary air controller.

In the drawings, 1 is a cylindrical casing closed at one end by means of an end wall 1ª. This latter is centrally provided with a hub-shaped portion 2, and a pin 3 is rotatably mounted therein, the inner end of said pin being provided with an arm 5 adjustably secured by means of a screw 4. At its free end the arm 5 is provided with a recess forming a fork in which is mounted a rotatable roller 6. The arm 5 is rockable by means of the pin 3, and the roller 6 runs along a leaf spring 7 resting against a ridge 8 on the inside of the cylindrical casing 1. The length of the spring 7 is about one half of the circumference of the cylindrical inside of the casing, and one end of the spring is rigidly secured to the ridge 8 by means of a clamp 9 and a screw 10 which passes through a bore in the casing and is screwed into a threaded bore in the clamp member 9. The one end of the latter is preferably bent so as to form a knee as shown in Fig. 1, and this clamp end is kept pressed against the spring 7 so as to keep it in a fixed position when screw 10 is tightened. The means just described and adapted for affixing the leaf spring 7 permits the latter to be easily adjusted and affixed in any desired position. For facilitating adjustment of the clamp 9 on the end of the leaf spring, the casing is provided with a ridge 11 or the like.

A link 12 is hingedly connected at its one end with the free end of the leaf spring, while the other end of the link is screwed into a threaded bore in the end of a stem 13 of a cone valve 14. The valve stem 13 may be locked in an adjusted position in relation to the link 12 by means of a nut 15. The casing 1 is provided with a tube stud 16, preferably integral with the casing, and such stud is screw threaded for connection of the end 17 of a tube 18 connected with the induction pipe 19 of the engine at a point between its main air inlet and the engine cylinders. The said tube 18 may be replaced by a rubber hose or the like. In the tube stud 16 there is a valve seat 21 having an extending ridge or flange 22 clamped between the edge of said stud and a shoulder in the tube end 17, as shown in Fig. 1.

The projecting end of the pin 3 is provided with an arm 23 hingedly connected with one end of a link 24 the other end of which is hingedly connected with an ear 26 provided on a rod 25. The said rod 25 serves for adjustment of the throttle valve 28 of the carburettor 20 by means of a lever 27 in the usual manner, and in case it is the question of a motor car engine the rod 25 may be acted upon by means of a gas pedal. A spring 29 serves for returning the throttle valve 28 into its closing position.

Figure 2:
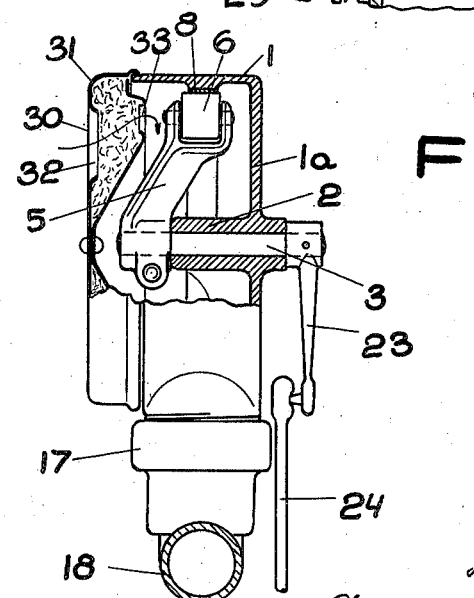
Fig. 2 is another elevation, partly in section, of the same at right angles to Fig. 1.

As shown in Fig. 2 the casing 1 is provided with a lid 30 in the shape of an air cleaner. Such air cleaner may be constructed in any suitable way, and in Fig. 2 it has been shown in the shape of a double walled lid forming an annular chamber coaxial with the centre of the apparatus, and such chamber is filled with a material 31 suitable for filtering the air, such as copper chips or the like. The air is sucked in through openings 32 in the air cleaner lid, passes the filter and enters through inner apertures 33 into the casing 1. Herefrom the air passes through the auxiliary air inlet controlled by the valve 14 and enters the induction pipe 19 in which the auxiliary air is admixed with the mixture of fuel and main combustion air coming from the carburettor.

The manner of action of the auxiliary air controller shown and described in the foregoing is as follows:—When the engine is running, the power of the same is controlled by adjustment (change) of the position of the throttle valve 28. This position is controlled by means of the rod 25, which simultaneously as it acts upon the throttle valve also acts upon the arm 5 carrying the roller 6. Hence, the arm 5 takes a new position for every new position of the throttle valve 28. In case the throttle 28 is moved towards its fully open position, the arm 5 is turned counterclockwise in Fig. 1, and thereby the inactive length of the leaf spring 7 between the attached end thereof and the roller 6 is reduced, whereas the active length of the spring between its free end and the roller 6 is enlarged so that the auxiliary air supply valve 14 can move more easily and a longer distance in its opening direction. In order that such a movement shall take place the valve must be acted upon in its opening direction by a force which overcomes the spring 7. The said force is created by the suction or vacuum at hand within the induction pipe 19 between the carburettor and the engine cylinders, and the magnitude of said force is determined by the load on the engine and its working condition as a whole. By a correct adjustment of the leaf spring 7 and the movement of the arm 5 in relation to the movement of the gas throttle valve 28, it will be possible for each position of the gas throttle valve to secure a resiliency and a power of the spring 7, which properly correspond to such position. Due to the suction of the engine the auxiliary air valve 14 opens so much that a controlled and correctly adjusted quantity of auxiliary air will be admixed with the air-fuel mixture coming from the carburettor, whereby the said mixture will get an ideal composition for any working condition incidentally at hand. This means that the engine, under all conditions, will work with the most suitable fuel mixture resulting in the best possible economy.

Experiments performed with the auxiliary air controller described in connection with engines provided with the best possible carburettors in the market have shown that an average saving of fuel amounting to 20%, or even more, is obtainable. The said experiments have been performed with motor cars, and it appeared that the greatest fuel saving as a rule was obtained at driving speeds ranging from 30 to 70 kilometers per hour, i. e. the most usual driving speeds.

The modified embodiment according to Figs. 3-5 refers to an improved construction of the auxiliary air valve and to means adapted still further to facilitate the correct adjustment of the auxiliary air controller, whether such adjustment is required for compensation of minor variations deriving from the manufacture or for adaption of the controller according to different conditions in different engines. As will be seen from Figs. 3 and 5, the link 12 has been given the shape of a stirrup embracing pins 13a on a nut 10 which is adjustably mounted on the stem 13. The upper end of the stirrup 12 is provided with a pin 12a in a position perpendicular to the pins 13a, and the pin 12a is embraced by the hook-shaped end of the spring 7. Hence, the connection between the auxiliary air valve 14 and the spring 7 will be in the shape of a Cardan joint so that it is turnable around two axes at right angles to each other, and this connection, when combined with a spherical shape of the valve member proper, gives the greatest possible freedom for self-centering of the valve in its seat. At its affixed end the leaf spring 7 is riveted to a member 7a provided with a slot penetrated by a screw 34 extending radially into the casing 1, and said member is acted upon by a coiled spring 36 surrounding the screw 34 and adapted to be compressed by means of a nut 35, and by means of adjusting screws 37, 38, it rests against another member 39 penetrated by the screw 34. The member 39 is provided with a resting face 39a for the screw 37, which face is preferably arc-shaped having its centre in the vicinity of the contact point between the roller 6 and the spring 7, when the arm 5 takes the normal position shown in the drawings. The other adjustment screw 38 is positioned in such a manner that the end of the adjustment screw 37 will slide on the resting face 39a when the first mentioned screw is turned. This arrangement has been found essentially to facilitate the correct adjustment of the spring 7. The inner end of the screw 34 preferably may be seated in a radial recess in the hub 2.

The utility of the invention is not confined to carburettor engines, as it may also be used in connection with engines in which only the air is sucked into the cylinders, whereas the fuel is separately injected into the same. Also in connection with engines of this kind it is desirable by means of a throttle valve or the like to control the main air inlet to the induction pipe and to provide such pipe with an auxiliary air inlet, whereby the latter may be automatically controlled to advantage by means of the auxiliary air controller according to the invention.

The invention is not confined to the embodiments described above for the sake of explanation, as even if these embodiments have been found to be especially advantageous it will naturally be possible in constructional respects to vary the same within wide limits without departing from the spirit of the invention or the scope of the appendant claims.

What we claim and desire to secure by Letters Patent is:—

1. In an internal combustion engine of the type described, in combination with an induction pipe having a main inlet, an adjustable throttle valve controlling the same, and an auxiliary air-inlet positioned behind said main inlet, a spring-loaded valve means in said auxiliary air-inlet adapted to be automatically opened against the action of the spring-load being variable in respect of its resiliency only under the influence of the vacuum created by the engine within said induction pipe, and means for positively varying the resiliency of the spring-load of said spring-loaded valve in dependence on the position of said throttle valve, the resiliency of the said spring-load increasing with increasing opening position of said throttle-valve, whereby said spring-loaded valve will move farther in its opening direction for the same increase of the vacuum within said induction pipe at a greater than at a less opening position of said throttle valve.

2. In the combination as specified in claim 1, the additional feature that the spring load on said auxiliary air valve means comprises a spring the active length of which is variable in dependence on the control of said throttle valve in a manner so that the active spring length is greater at a higher than at a lower degree of opening of said throttle valve.

3. In the combination as specified in claim 1, the additional feature that the spring acting upon said auxiliary valve means is a leaf spring rigidly secured at its one end and connected with said valve means at its other end, such spring having an intermediate supporting point positively movable in dependence on the control of said throttle valve so that the active spring length is increased when adjusting said throttle valve in its opening direction, and vice versa.

4. In the combination as specified in claim 1, the additional feature that the spring acting upon said auxiliary valve means is a circularly arc-shaped leaf spring rigidly secured at its one end and connected with said valve means at its other end, such spring being mounted concentrically to the axis of a turnable arm providing a movable intermediate supporting point for the spring and coupled with said throttle valve for variation of the active length of the spring so that such length is increased when said throttle valve is adjusted in its opening direction, and vice versa.

5. In the combination as specified in claim 1, the additional feature that the spring acting upon said auxiliary air valve means is a leaf spring rigidly secured at its one end and connected at its other end with a stem of said auxiliary air valve by means of a Cardan joint, the spring having an intermediate supporting point positively movable in dependence on the control of said throttle valve so that the active length of the spring is increased when adjusting the last mentioned valve in its opening direction, and the auxliary valve means having a spherical surface facing a valve seat.

6. In the combination as specified in claim 1, wherein the said main valve means is the main carburettor throttle; the additional feature that the spring acting upon said auxiliary valve means is a leaf spring rigidly secured at its one end and connected with said spring-loaded valve means at its other end, such spring having an intermediate supporting member movable along the spring and coupled with the said main carburettor throttle and adapted to increase the active length of the spring when said throttle is adjusted in its opening direction, and vice versa.

7. In an auxiliary air controller of the character described, an induction pipe having a main inlet, a main valve means adapted for manual control of said inlet, an auxiliary air inlet provided in the induction pipe at a point behind the main inlet counted in the direction of flow within the pipe, a substantially cylindrical casing communicating with said auxiliary inlet, such casing being provided with a valve seat, an auxiliary valve means coacting with said seat and adapted to control the flow through the auxiliary air inlet, a leaf spring mounted circumferentially within said casing and adapted for closing of the auxiliary valve means, means for rigidly securing one end of said spring to the casing, means for linking the other end of the spring to a stem of the auxiliary valve means, intermediate supporting means for said leaf spring, and means for moving said supporting means along the spring in dependence of the control of the main valve means so that the active spring length is increased upon said main valve being adjusted in its opening direction, and vice versa.

8. In an auxiliary air controller according to claim 7, the additional feature that at least one wall of the casing is constructed in the shape of an air cleaner forming an inlet to the interior of the casing.

9. In an auxiliary air controller according to claim 7, the additional feature that one end wall of the cylindrical casing is constructed in the shape of an air cleaner forming an inlet to the interior of the casing, whereas the opposite end wall is full and forms a bearing for a turnable arm providing an intermediate supporting means for the leaf spring, such arm being coupled with the main valve means for variation of the active length of the spring so that said length is increased when the main valve means is adjusted in its opening direction, and vice versa.

10. In an auxiliary air controller according to claim 7, the additional feature that the leaf spring at its one end is connected with the stem of the auxiliary valve means by means of a Cardan joint, the said valve means having a spherical surface facing the seat.

11. In an auxiliary air controller according to claim 7 the additional feature that the rigidly secured end of the leaf spring is adjustable circumferentially within the casing.

12. In an auxiliary air controller according to claim 7, the additional feature that the rigidly secured end of the leaf spring is adjustable both circumferentially and radially within the casing.

13. In an auxiliary air controller according to claim 7, the additional feature that the valve seat provided in connection with the cylindrical casing is positioned substantially diametrically opposite to the end of the leaf spring connected with the auxiliary air valve stem, the spring being substantially semi-circular and mounted so as to rest against the inner circumference of the casing.

14. In an auxiliary air controller according to claim 7, the additional feature that the intermediate supporting means for the leaf spring consists of a roller mounted at the free end of a turnable arm coupled with the main valve means for variation of the active spring length so that such length is increased when the main valve means is adjusted in its opening direction, and vice versa.

15. In an auxiliary air controller according to claim 7 and adapted to be used in connection with carburettor engines, the additional feature that the means for moving the intermediate supporting means along the spring is coupled with the main carburettor throttle.

AXEL HUGO WEIERTZ.
PER AXEL REINAR WEIERTZ.